(12) United States Patent
Fertlitsch et al.

(10) Patent No.: US 7,679,770 B2
(45) Date of Patent: Mar. 16, 2010

(54) METHODS AND SYSTEMS FOR PRINT-PROCESSOR-BASED PRINTER STATUS DETECTION AND PRINT TASK DISTRIBUTION

(75) Inventors: Andrew Fertlitsch, Tigard, OR (US); Jerry Steven Orleck, Portland, OR (US); Mary Louise Bourret, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 308 days.

(21) Appl. No.: 11/548,683

(22) Filed: Oct. 11, 2006

(65) Prior Publication Data

US 2007/0127063 A1    Jun. 7, 2007

Related U.S. Application Data

(63) Continuation of application No. 09/681,409, filed on Mar. 30, 2001, now abandoned, which is a continuation-in-part of application No. 09/681,208, filed on Feb. 22, 2001, now abandoned.

(60) Provisional application No. 60/261,132, filed on Jan. 11, 2001.

(51) Int. Cl.
*G06F 15/00* (2006.01)
*G06F 15/16* (2006.01)

(52) U.S. Cl. .................... 358/1.15; 709/203

(58) Field of Classification Search ............... 358/1.15, 358/1.16, 1.13, 1.14, 1.18, 1.1, 1.9, 302; 709/201, 203, 206, 213, 227; 710/1, 8, 15, 710/16, 17, 19, 14, 100, 120; 455/552.1, 455/556.1, 557; 400/62, 88; 715/239, 274, 715/738, 736; 726/26

See application file for complete search history.

(56) References Cited

U.S. PATENT DOCUMENTS 5,128,878 A    7/1992    Gore et al.

(Continued)

FOREIGN PATENT DOCUMENTS

EP    0738949    12/1996

(Continued)

OTHER PUBLICATIONS

U.S. Appl. No. 09/964,985—Office Action dated Dec. 17, 2008.

(Continued)

*Primary Examiner*—Saeid Ebrahimi Dehkordy
(74) *Attorney, Agent, or Firm*—Krieger Intellectual Property, Inc.; Scott C. Krieger (57) ABSTRACT

Embodiments of the present invention comprise methods and systems which enable a user to detect the status of printing devices without the use of additional hardware or application program modification for this purpose. These systems and methods are typically used in conjunction with a computer network comprising at least one computing device and a plurality of printing devices. When a print task is sent for printing it will activate a print processor for interpreting the print task. In addition to a print processor's interpretation function, the print processors of the present invention may detect the status of printing devices. Some embodiments may use this information to redirect or otherwise modify a print task for improved printing performance.

8 Claims, 9 Drawing Sheets

U.S. PATENT DOCUMENTS

| | | | |
|---|---|---|---|
| 5,241,397 A | 8/1993 | Yamada | |
| 5,287,194 A * | 2/1994 | Lobiondo | 358/296 |
| 5,467,434 A | 11/1995 | Hower et al. | |
| 5,528,734 A | 6/1996 | Sanchez | |
| 5,547,178 A | 8/1996 | Costello | |
| 5,550,954 A | 8/1996 | Campbell et al. | |
| 5,630,062 A | 5/1997 | Okutsu | |
| 5,697,040 A | 12/1997 | Rabjohns et al. | |
| 5,699,495 A * | 12/1997 | Snipp | 358/1.15 |
| 5,822,500 A | 10/1998 | Utsunomiya et al. | |
| 5,845,058 A | 12/1998 | Shaw et al. | |
| 5,859,711 A | 1/1999 | Barry et al. | |
| 5,867,706 A | 2/1999 | Martin et al. | |
| 5,897,260 A | 4/1999 | Zingher | |
| 5,918,988 A | 7/1999 | H.A.M. Van Oijen | |
| 5,940,186 A | 8/1999 | Barry et al. | |
| 5,960,168 A | 9/1999 | Shaw et al. | |
| 5,978,560 A | 11/1999 | Tan et al. | |
| 5,978,650 A | 11/1999 | Fischer et al. | |
| 5,982,996 A | 11/1999 | Snyders | |
| 5,995,721 A | 11/1999 | Rourke et al. | |
| 5,995,723 A | 11/1999 | Sperry et al. | |
| 6,049,394 A | 4/2000 | Fukushima | |
| 6,055,063 A | 4/2000 | Yang et al. | |
| 6,057,930 A | 5/2000 | Blossey et al. | |
| 6,078,960 A | 6/2000 | Ballard | |
| 6,088,120 A | 7/2000 | Shibusawa et al. | |
| 6,101,508 A | 8/2000 | Wolff | |
| 6,118,546 A | 9/2000 | Sanchez et al. | |
| 6,148,346 A | 11/2000 | Hanson | |
| 6,157,465 A | 12/2000 | Suda et al. | |
| 6,172,765 B1 | 1/2001 | Kawamoto | |
| 6,173,295 B1 | 1/2001 | Goertz et al. | |
| 6,219,151 B1 | 4/2001 | Manglapus et al. | |
| 6,229,622 B1 | 5/2001 | Takeda | |
| 6,248,996 B1 | 6/2001 | Johnson et al. | |
| RE37,258 E | 7/2001 | Patel et al. | |
| 6,266,150 B1 | 7/2001 | Brossman et al. | |
| 6,320,667 B1 | 11/2001 | Mitsuhashi | |
| 6,337,745 B1 | 1/2002 | Aiello, Jr. et al. | |
| 6,348,971 B2 * | 2/2002 | Owa et al. | 358/1.15 |
| 6,348,972 B1 * | 2/2002 | Taniguchi et al. | 358/1.15 |
| 6,397,245 B1 * | 5/2002 | Johnson et al. | 709/203 |
| 6,452,692 B1 | 9/2002 | Yacoub | |
| 6,474,881 B1 | 11/2002 | Wanda | |
| 6,476,927 B1 | 11/2002 | Schwarz, Jr. | |
| 6,509,974 B1 | 1/2003 | Hansen | |
| 6,529,286 B1 | 3/2003 | King | |
| 6,552,813 B2 * | 4/2003 | Yacoub | 358/1.1 |
| 6,570,669 B1 * | 5/2003 | Onuma | 358/1.15 |
| 6,580,521 B1 | 6/2003 | Nishikawa et al. | |
| 6,584,503 B1 * | 6/2003 | Carney et al. | 709/224 |
| 6,609,210 B1 | 8/2003 | Onuma | |
| 6,618,167 B1 | 9/2003 | Shah | |
| 6,654,136 B2 * | 11/2003 | Shimada | 358/1.15 |
| 6,654,509 B2 | 11/2003 | Nishikawa et al. | |
| 6,661,531 B1 | 12/2003 | Murphy et al. | |
| 6,665,082 B1 | 12/2003 | Takeoka et al. | |
| 6,697,165 B2 * | 2/2004 | Wakai et al. | 358/1.11 |
| 6,700,678 B1 | 3/2004 | Luman | |
| 6,707,568 B1 | 3/2004 | Yu | |
| 6,724,494 B1 | 4/2004 | Danknick | |
| 6,748,471 B1 | 6/2004 | Keeney et al. | |
| 6,757,071 B1 | 6/2004 | Goodman et al. | |
| 6,816,270 B1 | 11/2004 | Cooper et al. | |
| 6,825,943 B1 | 11/2004 | Barry et al. | |
| 6,863,367 B2 | 3/2005 | Hamamoto et al. | |
| 6,981,632 B2 | 5/2005 | Schwartz | |
| 6,956,664 B1 | 10/2005 | Kutty | |
| 6,965,958 B1 * | 11/2005 | Sugiyama | 710/104 |
| 6,985,245 B1 | 1/2006 | Takahashi | |
| 7,031,014 B2 | 4/2006 | Ohwa | |
| 7,046,384 B2 | 5/2006 | Ferlitsch et al. | |
| 7,072,057 B1 | 7/2006 | Hansen | |
| 7,081,969 B1 | 7/2006 | Motomed et al. | |
| 7,084,998 B2 | 8/2006 | Blair et al. | |
| 7,139,085 B1 | 11/2006 | Sakaguchi | |
| 7,148,980 B2 | 12/2006 | Tominaga | |
| 7,155,669 B1 | 12/2006 | Nakagiri et al. | |
| 7,161,693 B2 | 1/2007 | Kizaki et al. | |
| 7,239,411 B2 | 7/2007 | Kelsey | |
| 2001/0038462 A1 | 11/2001 | Teeuwen et al. | |
| 2002/0001495 A1 | 1/2002 | Mochizuki | |
| 2002/0027673 A1 | 3/2002 | Roosen et al. | |
| 2002/0042798 A1 | 4/2002 | Takei et al. | |
| 2002/0059489 A1 | 5/2002 | Davis et al. | |
| 2002/0060801 A1 | 5/2002 | Motomed et al. | |
| 2002/0101600 A1 | 8/2002 | Sabbagh et al. | |
| 2002/0101604 A1 * | 8/2002 | Mima et al. | 358/1.15 |
| 2002/0112037 A1 | 8/2002 | Koss | |
| 2002/0113989 A1 | 8/2002 | Ferlitsch et al. | |
| 2002/0138564 A1 | 9/2002 | Treptow et al. | |
| 2002/0163665 A1 | 11/2002 | Iwata et al. | |
| 2002/0186407 A1 | 12/2002 | Laughlin | |
| 2003/0002069 A1 | 1/2003 | Bhogal et al. | |
| 2003/0011812 A1 | 1/2003 | Sesek et al. | |
| 2003/0038964 A1 | 2/2003 | Ferlitsch | |
| 2003/0048472 A1 | 3/2003 | Perdu et al. | |
| 2003/0184782 A1 | 10/2003 | Perkins et al. | |
| 2004/0042042 A1 * | 3/2004 | Utsunomiya | 358/1.15 |
| 2004/0105122 A1 * | 6/2004 | Schaeffer | 358/1.15 |
| 2006/0033958 A1 | 2/2006 | d'Entrecasteaux | |
| 2006/0155825 A1 | 7/2006 | Torii | |

FOREIGN PATENT DOCUMENTS

| | | |
|---|---|---|
| JP | 64-014043 | 1/1989 |
| JP | 03282727 | 12/1991 |
| JP | 04-199218 | 7/1992 |
| JP | 04217550 | 8/1992 |
| JP | 05-270064 | 10/1993 |
| JP | 06-004239 | 1/1994 |
| JP | 07219731 | 8/1995 |
| JP | 08-101754 | 4/1996 |
| JP | 09-030040 | 2/1997 |
| JP | 09222964 | 8/1997 |
| JP | 09-319530 | 12/1997 |
| JP | 10-027149 | 1/1998 |
| JP | 10027076 | 1/1998 |
| JP | 10-031750 | 2/1998 |
| JP | 10154049 | 6/1998 |
| JP | 10-187393 | 7/1998 |
| JP | 10-207643 | 8/1998 |
| JP | 10240477 | 9/1998 |
| JP | 10-283130 | 10/1998 |
| JP | 10-340166 | 12/1998 |
| JP | 10-340167 | 12/1998 |
| JP | 11-015608 | 1/1999 |
| JP | 11-024860 | 1/1999 |
| JP | 11110143 | 4/1999 |
| JP | 11-143661 | 5/1999 |
| JP | 11219265 | 8/1999 |
| JP | 11296333 | 10/1999 |
| JP | 2000003258 | 1/2000 |
| JP | 2000-099303 | 4/2000 |
| JP | 2000-132347 | 5/2000 |
| JP | 2000-151873 | 5/2000 |
| JP | 2001071590 | 3/2001 |
| JP | 2001-088405 | 4/2001 |
| WO | WO01/31432 | 5/2001 |

OTHER PUBLICATIONS

U.S. Appl. No. 09/964,985—Office Action dated Aug. 5, 2008.
U.S. Appl. No. 10/404,789—Office Action dated Nov. 10, 2008.

U.S. Appl. No. 09/683,667—Office Action dated Oct. 31, 2008.
U.S. Appl. No. 09/967,592—Office Action dated Apr. 24, 2009.
U.S. Appl. No. 09/967,592—Office Action dated Oct. 2, 2008.
U.S. Appl. No. 09/683,667—Notice of Allowance dated Feb. 9, 2009.
U.S. Appl. No. 09/894,928—Notice of Allowance dated Sep. 15, 2008.
U.S. Appl. No. 09/932,661—Notice of Allowance dated Dec. 12, 2007.
U.S. Appl. No. 10/396,201—Notice of Allowance dated Jun. 18, 2007.
U.S. Appl. No. 09/681,208—Office Action dated Jul. 19, 2007.
U.S. Appl. No. 09/681,208—Office Action dated Jan. 8, 2007.
U.S. Appl. No. 09/681,208—Office Action dated Jul. 28, 2006.
U.S. Appl. No. 09/681,208—Office Action dated Jan. 12, 2006.
U.S. Appl. No. 09/681,208—Office Action dated May 4, 2005.
U.S. Appl. No. 09/681,208—Office Action dated Oct. 22, 2004.
U.S. Appl. No. 09/681,416—Office Action dated Aug. 11, 2005.
U.S. Appl. No. 09/681,416—Office Action dated Nov. 16, 2004.
U.S. Appl. No. 09/681,409—Office Action dated Aug. 11, 2006.
U.S. Appl. No. 09/681,409—Office Action dated Jan. 25, 2006.
U.S. Appl. No. 09/681,409—Office Action dated Jul. 29, 2005.
U.S. Appl. No. 09/681,409—Office Action dated Nov. 17, 2004.
U.S. Appl. No. 09/683,667—Office Action dated Apr. 15, 2008.
U.S. Appl. No. 09/683,667—Office Action dated Oct. 29, 2007.
U.S. Appl. No. 09/683,667—Office Action dated May 7, 2007.
U.S. Appl. No. 09/683,667—Office Action dated Nov. 17, 2006.
U.S. Appl. No. 09/683,667—Office Action dated Jun. 1, 2006.
U.S. Appl. No. 09/683,667—Office Action dated Dec. 13, 2005.
U.S. Appl. No. 09/683,667—Office Action dated Jun. 22, 2005.
U.S. Appl. No. 10/404,789—Office Action dated May 21, 2008.
U.S. Appl. No. 10/404,789—Office Action dated Nov. 28, 2007.
U.S. Appl. No. 10/404,789—Office Action dated Jul. 11, 2007.
U.S. Appl. No. 10/404,789—Office Action dated Feb. 6, 2007.
U.S. Appl. No. 10/404,789—Office Action dated Aug. 23, 2006.
U.S. Appl. No. 10/404,789—Office Action dated Mar. 15, 2006.
U.S. Appl. No. 10/404,789—Office Action dated Jul. 27, 2005.
U.S. Appl. No. 10/003,800—Office Action dated Apr. 20, 2006.
U.S. Appl. No. 10/003,800—Office Action dated Dec. 13, 2005.
U.S. Appl. No. 10/003,800—Office Action dated Jun. 15, 2005.
U.S. Appl. No. 09/683,162—Office Action dated Apr. 16, 2008.
U.S. Appl. No. 09/683,162—Office Action dated Oct. 29, 2007.
U.S. Appl. No. 09/683,162—Office Action dated May 17, 2007.
U.S. Appl. No. 09/683,162—Office Action dated Nov. 27, 2006.
U.S. Appl. No. 09/683,162—Office Action dated Jan. 10, 2006.
U.S. Appl. No. 09/683,162—Office Action dated Jun. 22, 2005.
U.S. Appl. No. 09/894,928—Office Action dated Mar. 17, 2008.
U.S. Appl. No. 09/894,928—Office Action dated Sep. 11, 2007.
U.S. Appl. No. 09/894,928—Office Action dated Mar. 2, 2007.
U.S. Appl. No. 09/894,928—Office Action dated Sep. 7, 2006.
U.S. Appl. No. 09/894,928—Office Action dated Mar. 15, 2006.
U.S. Appl. No. 09/894,928—Office Action dated Sep. 8, 2005.
U.S. Appl. No. 10/396,201—Office Action dated Jan. 23, 2007.
U.S. Appl. No. 09/964,985—Office Action dated Jan. 4, 2008.
U.S. Appl. No. 09/964,985—Office Action dated Jul. 17, 2007.
U.S. Appl. No. 09/964,985—Office Action dated Jan. 25, 2007.
U.S. Appl. No. 09/964,985—Office Action dated Aug. 10, 2006.
U.S. Appl. No. 09/964,985—Office Action dated Mar. 13, 2006.
U.S. Appl. No. 09/964,985—Office Action dated Sep. 13, 2005.
U.S. Appl. No. 09/932,661—Office Action dated Jun. 8, 2007.
U.S. Appl. No. 09/932,661—Office Action dated Jun. 27, 2006.
U.S. Appl. No. 09/932,661—Office Action dated Nov. 28, 2005.
U.S. Appl. No. 09/932,661—Office Action dated May 4, 2005.
U.S. Appl. No. 10/002,781—Office Action dated Nov. 17, 2006.
U.S. Appl. No. 10/002,781—Office Action dated May 1, 2006.
U.S. Appl. No. 10/002,781—Office Action dated Nov. 28, 2005.
U.S. Appl. No. 10/002,781—Office Action dated Jun. 15, 2005.
U.S. Appl. No. 09/967,592—Office Action dated Jun. 12, 2008.
U.S. Appl. No. 09/967,592—Office Action dated Dec. 12, 2007.
U.S. Appl. No. 09/967,592—Office Action dated Jun. 27, 2007.
U.S. Appl. No. 09/967,592—Office Action dated Nov. 29, 2006.
U.S. Appl. No. 09/967,592—Office Action dated Jun. 15, 2006.
U.S. Appl. No. 09/967,592—Office Action dated Jan. 27, 2006.
U.S. Appl. No. 09/967,592—Office Action dated Aug. 10, 2005.
IBM AS/40 Printing V, Oct. 2000, http://www.redbooks.ibm.com/redbooks/pdfs/sg242160.pdf.
PostScript Language Document Structuring Conventions Specification, Version 3.0, Adobe Systems Incorporated, 1992.

* cited by examiner

METHODS AND SYSTEMS FOR PRINT-PROCESSOR-BASED PRINTER STATUS DETECTION AND PRINT TASK DISTRIBUTION

RELATED REFERENCES

This application is a continuation of U.S. patent application Ser. No. 09/681,409, filed Mar. 30, 2001 now abandoned, which is a continuation-in-part of U.S. patent application Ser. No. 09/681,208, filed Feb. 22, 2001 now abandoned; U.S. patent application Ser. No. 09/681,409 also claims the benefit of U.S. Provisional Application No. 60/261,132, filed Jan. 11, 2001.

FIELD OF THE INVENTION

Embodiments of the present invention comprise methods and systems for print-processor-based printer status detection and print task distribution.

BACKGROUND

Embodiments of the present invention relate to methods and systems for detecting printing devices and distributing print tasks to printers in a network. More particularly, these embodiments relate to methods and systems for detecting printer status and distributing print tasks in a network cluster printing environment through the use of novel print-processor-based applications. These embodiments provide increased print system performance and avoid failed print tasks without the use of additional hardware.

Many offices can generate a high volume of printer output or require high print rates to meet deadlines. When these needs are fairly constant, large, high-production printers and associated hardware may be required. These high-production units are expensive to procure and maintain and, generally, are only made economically feasible by a constant high demand for printer output. When printer requirements fluctuate, the costs of these high-production printers are difficult to justify. However, when sporadic, high printer throughput is a necessity, some offices are forced to bear the costs of expensive printer equipment that runs at well below its capacity most of the time.

Cluster printing has been introduced to avoid this problem. Cluster printing involves the use of multiple printers in a network. With cluster printing, print jobs can be sent to a multiple printer network with a capacity that rivals the capacity of expensive, high-throughput equipment. Generally, this network is comprised of multiple lower-production printers that may already exist in an office environment making the cost of the network very manageable.

Through the use of cluster printing, a user may choose to split a single print job among several printers to increase print job speed and decrease print time. Print jobs that include multiple copies may be divided so that each printer in a network prints some of the copies. Other variations of print job distribution may also be implemented.

Cluster printing may be implemented through specialized printers which contain cluster-enabling firmware. When these printers are interconnected via cables, they can share printing jobs. In some cases, the marking engines are connected to enable division of printing tasks between the connected printers.

Other methods of implementing cluster printing functions require the use of additional hardware or application software. Typically, a specialized print server is used. This server is generally a high-performance general purpose computer to which print jobs are directed by the network. Specialized software on the server allows print jobs or copies thereof to be distributed among multiple printers that are managed by the server.

These known cluster printing implementations require specialized printer or server hardware or software to provide cluster printing functions.

Another problem that exists in single printer, cluster printing, network printing and other environments is that of printer status detection. When a print job is initiated, a user typically selects a printer or printers based on the printersuser' location and/or capabilities. However, if one or more selected printers are offline, in an error state, busy, or for some other reason, unavailable, the print job may not be completed in an acceptable time period or may not be completed at all. Typically, an error message is returned to the user who must then select another printer or correct the problem preventing the selected printer from functioning. In some network printing cases involving print queues, no error message is returned and the user is left unaware of the printing problem. When a print job is time sensitive this process can be frustrating causing missed deadlines and tarnished reputations.

Printer status detection can be especially important in cluster printing environments where print tasks are divided among several printing devices. When a user or the user's computing device is not aware of the status of the printing devices selected for printing, a print task or portions thereof can be delayed, interrupted or lost.

SUMMARY

Embodiments of the present invention comprise methods and systems which enable a user to detect printer status and distribute print tasks to a plurality of printing devices without the use of additional hardware or server software for this purpose. These systems and methods are typically used in conjunction with a computer network comprising at least one computing device and a plurality of printing devices. Printing tasks which are typically sent to a user-selected printing device may be distributed to available printing devices to increase printing speed, volume and/or capacity. This printer status detection, availability determination and distribution capability can be achieved without the use of additional hardware and firmware and without modification to software applications.

Embodiments of the present invention comprise a novel print processor which is capable of detecting the status of printing devices. This detection may take place when a print task is sent to the print processor, prior to print task transmission, during the printing process or at some other time. Typically, printing device status is detected at the time a print task is sent to the print processor. If a print task is initially directed to a printing device that is unavailable or otherwise unable to function for the current task, the print processor of the present invention may redirect the print task to another printing device that is available for use.

In some cluster printing embodiments, the printing device status may be used to determine cluster printing parameters. For example, and not by way of limitation, a print task may be divided among the maximum number of available printing devices as determined by the status detection of embodiments of the present invention. As another non-limiting example, a print task may be divided among the maximum number of available printers within a given distance to a user. Other embodiments may use printing device status information to customize these and other cluster printing parameters.

BRIEF DESCRIPTION OF THE SEVERAL DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF EXEMPLARY EMBODIMENTS

The figures listed above are expressly incorporated as part of this detailed description. It will be readily understood that the components of the present invention, as generally described and illustrated in the figures herein, could be arranged and designed in a wide variety of different configurations. Thus, the following more detailed description of the embodiments of the systems and methods of the present invention, as represented in FIGS. 1 through 5 is not intended to limit the scope of the invention, as claimed, but it is merely representative of the presently preferred embodiments of the invention. The currently preferred embodiments of the present invention will be best understood by reference to the drawings, wherein like parts are designated by like numerals throughout.

The definitions in this and subsequent paragraphs apply throughout this specification and related claims. The term "print job" may refer to any combination of data that can be printed. A print job may comprise text and/or graphics and may comprise part of a page, a single page or many pages. Print jobs may be rendered or unrendered. Generally, a print job is generated by an application, such as a word processor, spread sheet, etc., however, a print job may also comprise a file or data in memory that may be sent directly to a print process.

The term "print copy" or "copy" may refer to data, code or commands which generate a single printing device output of a print job or may refer to the actual hard copy output of the print job.

The term "print task" may comprise any combination of print jobs and copies thereof. A print task may comprise one or more print jobs and one or more copies of each print job.

The term "copy splitting" may refer to a process by which a print task comprising multiple copies is divided into multiple modified print tasks with each modified print task comprising a portion of the total number of copies.

The term "job splitting" may refer to a process by which a print task comprising at least one print job is split into multiple modified print tasks with each modified print task comprising a portion of a print job.

References to a Microsoft Windows® or Windows® operating system may refer to any version or variation of a Microsoft Windows® operating system comprising Windows 95®, Windows 98®, Windows NT®, Windows 2000®, Windows ME®, Windows XP® and others. While exemplary embodiments of the present invention may be directed to a Windows® operating system and environment, systems and methods directed to other operating systems such as Macintosh®, UNIX, DOS, Linux, MVS and others are to be contemplated within the scope of the present invention.

Embodiments of the present invention may be embodied in software, firmware, hardware and other forms that achieve the function described herein. As embodiments of the present invention may be adapted to many environments with varying computing devices, operating systems, printing devices, network hardware and software, applications and other variables, these embodiments may take many forms to achieve their function. Some embodiments may also be transmitted as signals, for example, and not by way of limitation, embodiments may be transmitted as analog or digital electrical signals or as light in a fiber-optic line. All of these embodiments are to be considered within the scope of the present invention.

Embodiments of the present invention may be used to achieve printing device status detection and analysis, print task modification, copy splitting, job splitting and various combinations of these concepts along with related distribution tasks that allow modified or unmodified print tasks to be distributed to one or more printing devices. In some embodiments, printer status is detected and analyzed to determine a print task destination or modified print task destination. In other embodiments, printer status and printer capabilities may be used to modify a print task to print on a specific printer.

Figure 1:
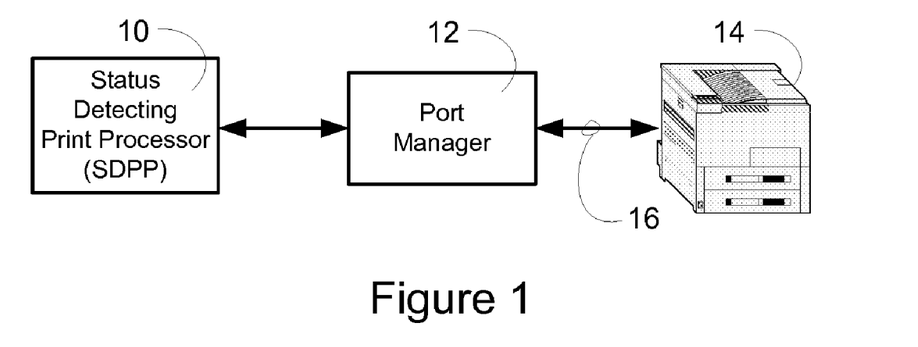
FIG. 1 is a diagram showing an embodiment of the present invention comprising printer availability detection for a local printer.

Some embodiments of the present invention may detect the status of a local printing device. A local printing device is a printing device that is directly connected to a communications port on a computing device and which is being used by a user of that computing device. For example, and not by way of limitation, a printer connected to a USB port, a parallel port or a serial port on a desktop computer is a local printer when it is being used by that computer. When a local printer is used, as shown in FIG. 1, a status detecting print processor (SDPP) 10 of the present invention may be used to detect the status of the local printer. This may be done by querying a port manager 12 which can access information about the devices connected to the various ports on a computer. The port manager 14 can communicate with the devices connected to its ports and determine their status. In some cases, a bi-directional communication 16 may be established between a port manager 12 and a printing device 14. This communication is generally carried out using a printing or communication protocol. Using this protocol or a similar process, a printing device status may be determined by the port manager 12 and communicated back to the MPP 10. In this way, a port manager may typically determine printing device status such as conditions where a printing device is offline, busy, ready to print, or in an error state. Other status conditions may also be determined according to the capabilities and limitations of the port manager, printing/communications protocol, printing device, operating system and other factors. Depending on these factors, an estimated time to current job completion, printer speeds (i.e., ppm) particular error state details and other status details may also be determined.

Embodiments of the present invention may also be used to detect printing device status on network printing devices. This may be done in several ways. Some of these methods are described in reference to FIG. 2. A status detecting print processor (SDPP) 20 may communicate with a port manager 22 and access information regarding devices connected to its ports. In a network environment, a port manager 22 may communicate with a print server 26 and obtain information about a network print queue 28. A port manager 22 may use an application program interface (API) to communicate with the print server 26 and obtain network queue 28 information. As a non-limiting example, in a Microsoft Windows® environment the "(GetPrinter)" call may be used to obtain printer queue 28 information. Printer queue 28 information may comprise the number of print jobs in the queue which may be used to determine if the associated printer 24 is busy or idle.

Figure 2:
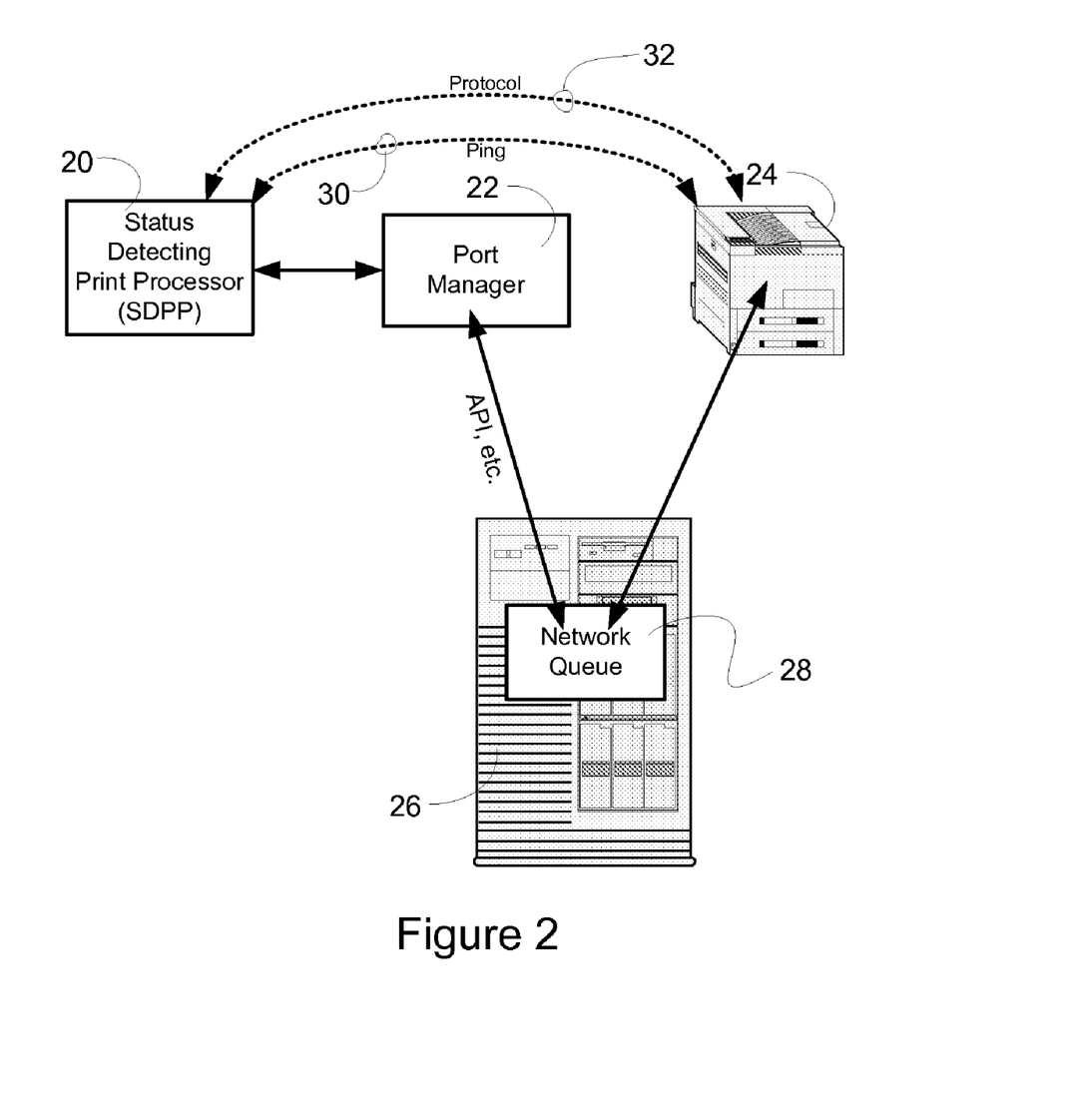
FIG. 2 is a diagram showing an embodiment of the present invention comprising printer availability detection for networked printers.

A SDPP 20 may communicate directly with a network printer 24 by pinging 30 the printer 24 to determine its status. If a printer 24 responds to the ping 30, the SDPP may determine that the printer 24 is online in a ready to print or busy state or offline in an error state (off.errorstate). If a printer 24 does not respond to a ping 30, the SDPP may determine that the printer 24 is offline.

Some embodiments of the present invention may also comprise a SDPP 20 which employs a communication protocol 32 to communicate directly with a network printing device 24. A SDPP 20 may use the Simple Network Management Protocol (SNMP) to send protocol data units (PDUs) to network devices and gather information from device Management Information Bases (MIBs) to determine device status. Using this technique, a SDPP 20 may determine if a printing device is offline, busy, ready to print, in an error state and other status information. When a printing device 24 is busy, more detail can be obtained such as print job identification, job size, estimated time to completion and other details. When a printing device 24 is ready, more detail may also be obtained such as whether the printing device 24 is idle (cool) or warm. A newer remote monitoring protocol (RMON) may also be used to determine printing device status. RMON embodiments utilize additional MIBs beyond those established for SNMP protocols. In addition to printing device information, RMON embodiments may also gather network traffic data to further refine a deviceuser's status. Other embodiment may comprise an Internet Printing Protocol (IPP) and HTTP servers.

Figure 3:
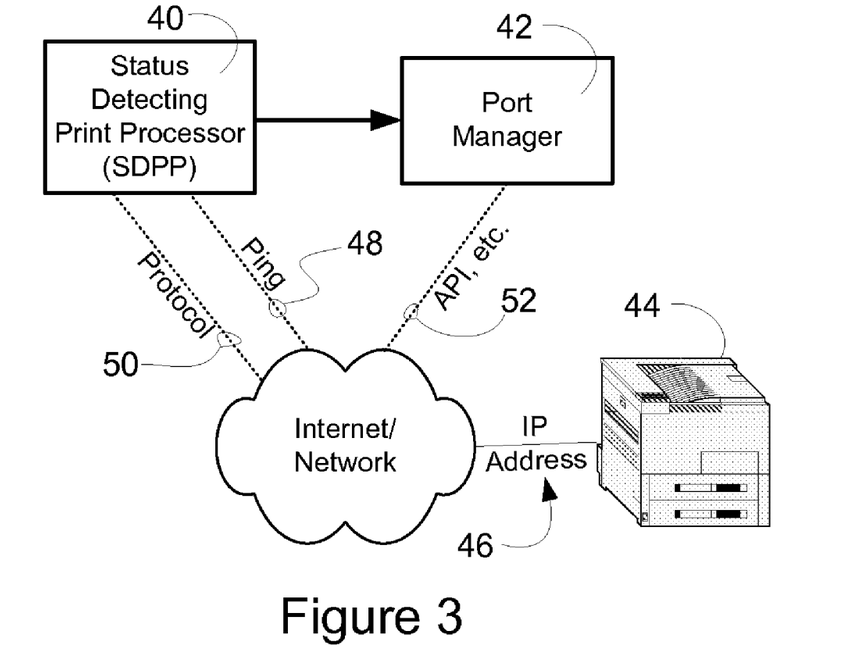
FIG. 3 is a diagram showing an embodiment of the present invention comprising printer availability detection for remote printers.

Embodiments of the present invention may also detect the status of remote printing devices as shown in FIG. 3. Remote printing devices 44 may be connected to a computing device at a location that is not directly connected to the computing device and that is not directly connected to the network of the computing device. These printing devices are generally connected through an internet connection via an IP address 46.

The status of remote printing devices 44 may be detected by methods similar to those used for network printing devices. A SDPP 40 may ping 48 a remote printing device 44 directly via its IP address 46 and determine a ready or offline status based on a response or lack of response, respectively. A SDPP 40 may also utilize communications protocols 50 such as SNMP and RMON to communicate directly with a printing device 44 and access status information contained in the device's MIBs. These communications protocol methods may be used to determine if a printing device is offline, busy, ready to print, in an error state or other status information. When a printing device 44 is busy, more detail can be obtained such as print job identification, job size, estimated time to completion and other details. When a printing device 44 is ready, more detail may also be obtained such as whether the printing device 24 is idle (cool) or warm.

A SDPP 40 may also communicate 52 with a remote printing device 44 through a port manager 42. Through the port manager 42, an API may be used to communicate with the remote printing device 44 and ascertain the status of the printing device. In some embodiments, a Graphical Device Interface (GDI) API may be used to determine printing device status.

Figure 4:
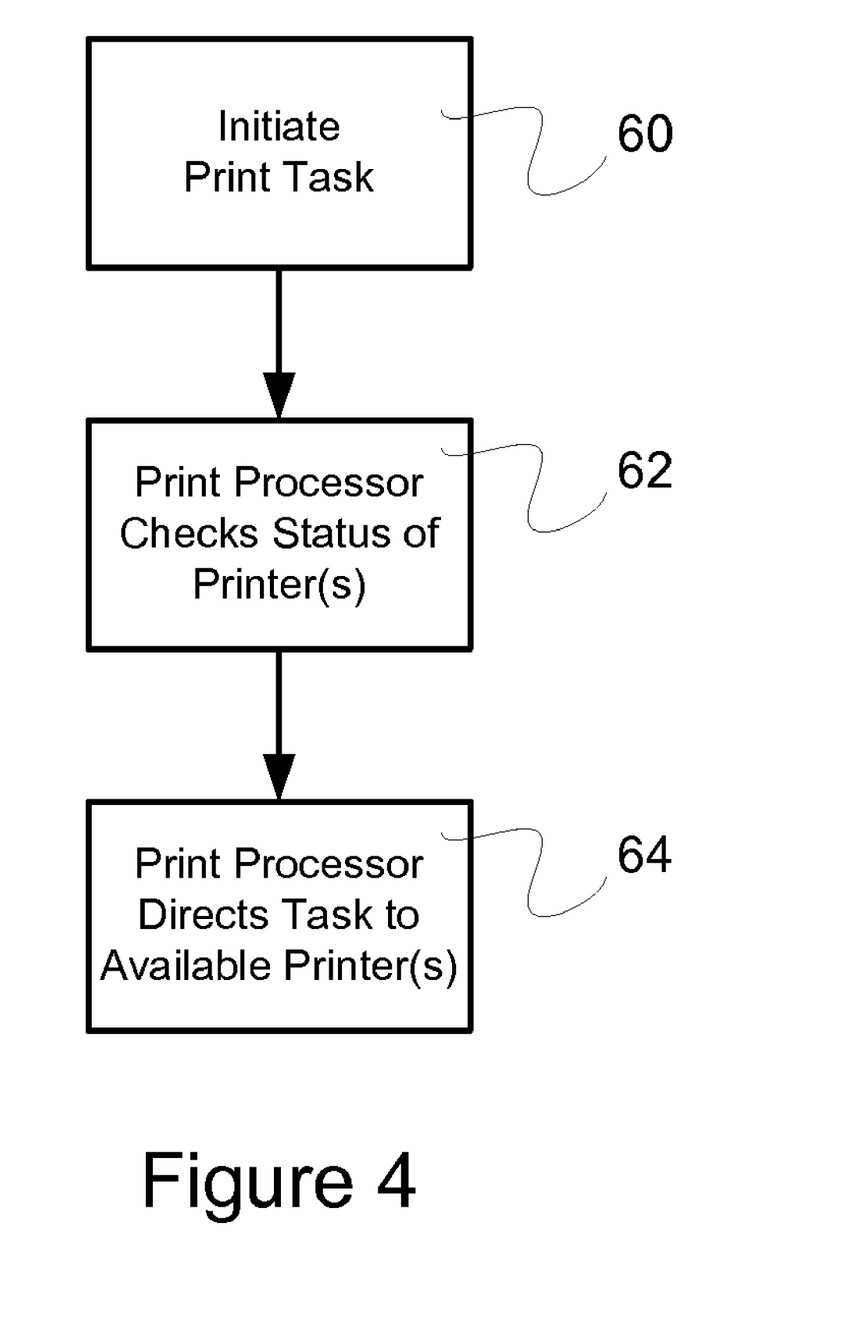
FIG. 4 is a diagram showing an embodiment of the present invention wherein printer availability is detected.

Some embodiments of the present invention, as shown diagrammatically in FIG. 4, enable a computing device to detect the status of printing devices and direct a print task according to device availability. Typically, a print task is initiated 60 from an application program, an operating system command or some other method. This initial procedure generally activates a print driver which may allow a user to select a print destination and format. A user generally selects a destination device that is appropriate for the desired task. The capabilities and limitations of this selected destination device may be used by these embodiments to determine compatible devices parameters.

Once the task is defined by the driver, it may create a print task spool file which is sent to a spooler. The spooler, then, sends the print task to a print processor for interpretation. In these embodiments of the present invention, the print processor may detect 62 the status of printing devices to determine their availability and capacity to perform a print task. When an available printing device is detected, the print processor may direct 64 the print task to the available device. This device to which the task is directed may be the device initially selected by a user, or another device selected by the print processor according to availability or some other parameter. The initially selected device may also be a virtual device.

Embodiments of the present invention may switch or redirect tasks between any printing devices that are compatible. Printing devices, such as printers, are generally compatible when they share the same Page Description Language (PDL) and have marking engines that share a similar geometric format. Other types of printing devices may be compatible when they share the same driver or description language.

Figure 5:
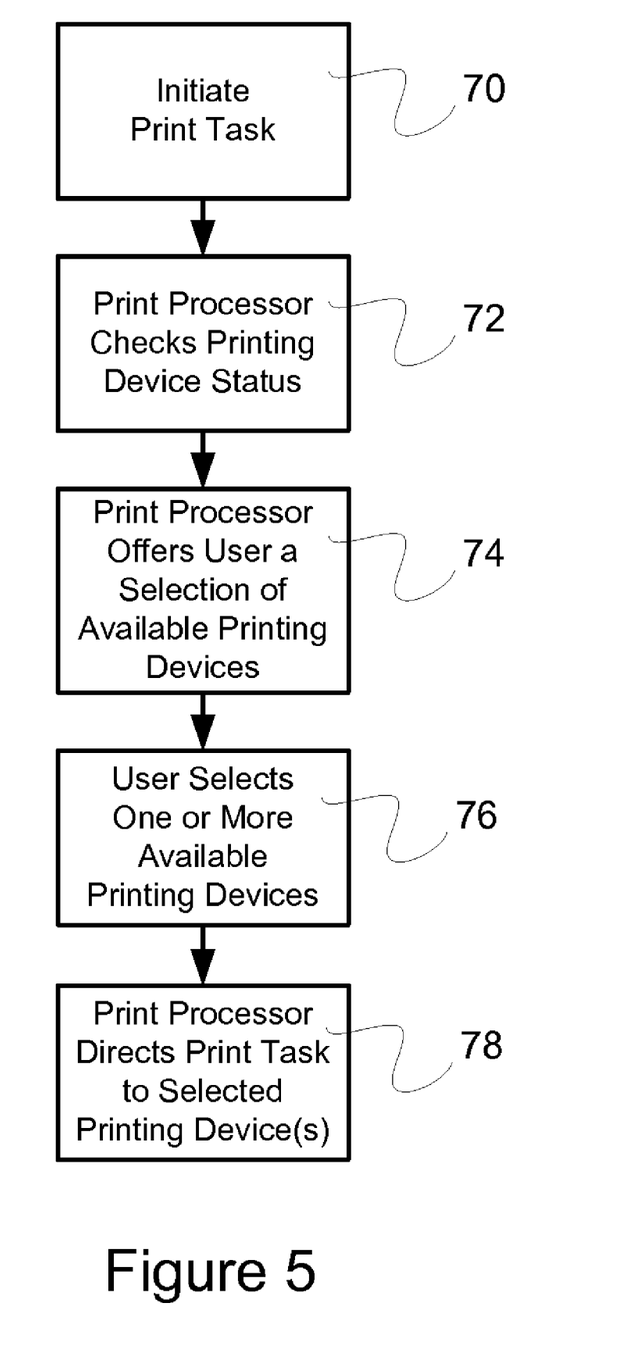
FIG. 5 is a diagram showing an embodiment of the present invention comprising printing device detection and a user selection interface.

Other embodiments of the present invention may employ a user interface to prompt for user selection of available devices as shown in FIG. 5. In these embodiments, a print task is initiated 70 and the task is transmitted through the necessary drivers, spoolers and other processes until it arrives at a print processor. The print processor, then, checks 72 the status of printing devices in communication with it and compiles a list of available printing devices. This list of available devices is presented 74 to a user and the user is prompted to make a selection among the available devices. Any form of user interface may be used to prompt the user, such as a dialog box, checkbox list or some other selection interface. The user selects 76 a preferred device in the case of a single device task or, in the case of a cluster printing task, a user may select a group of available devices. Once a device or devices has been selected, the print processor of the present invention directs 78 the print task to the selected printing device or devices.

Figure 6:
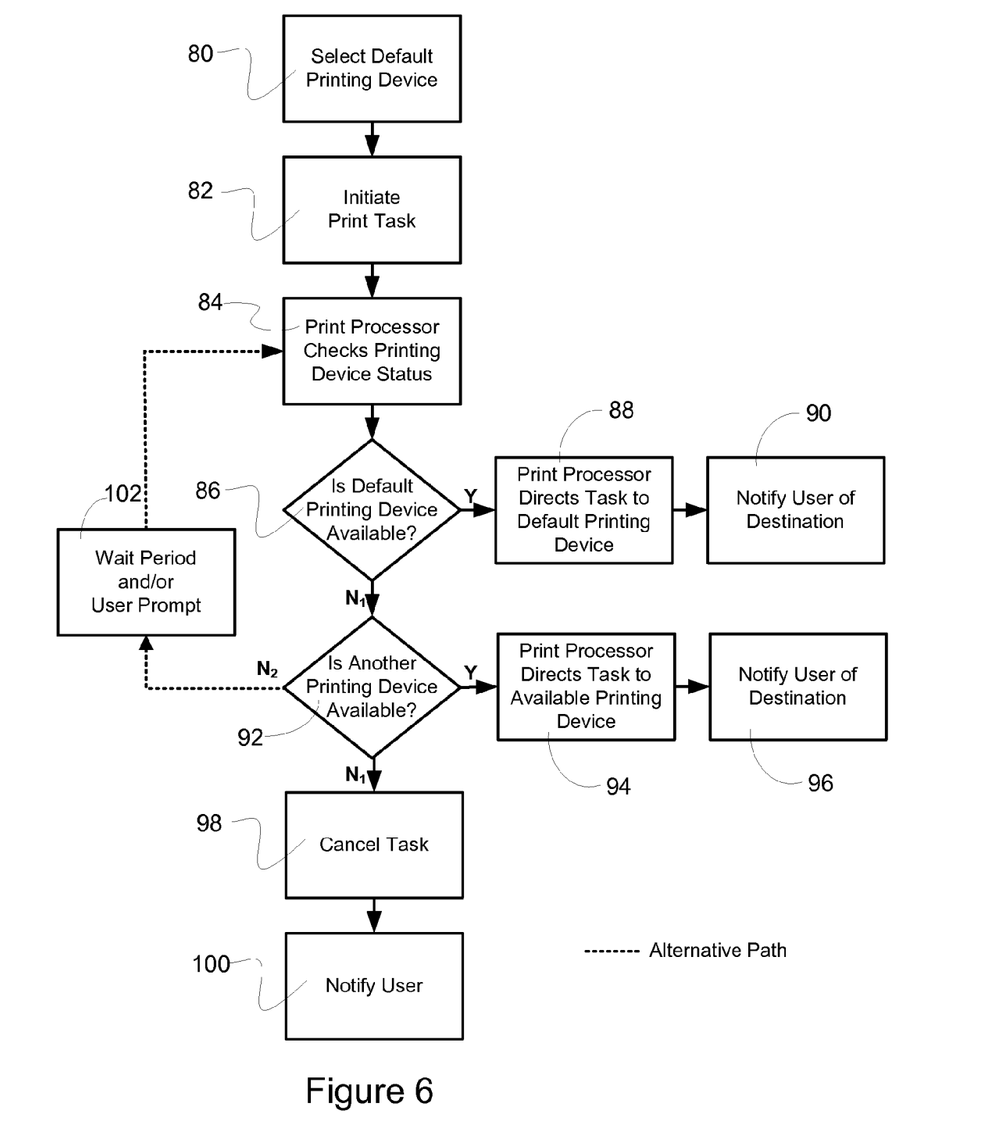
FIG. 6 is a diagram showing an embodiment of the present invention comprising printing device detection and task rollover.

Further embodiments of the present invention may be used to accomplish a print task rollover process as illustrated in FIG. 6. A print rollover process is used to prevent print task delays when a default or preferred printer or printers are busy, offline or otherwise unavailable or unusable. In the print rollover process, a user generally selects a default printing device 80 which may be stored according to many known methods. A user then initiates a print task 82. This can be done in a variety of ways including, but not limited to, selecting a print option in an application, running a batch file and others. Once the print task is initiated 82, or during initiation, a print driver is typically used to create a spool file that is sent to a spooler for spooling to a print processor. In embodiments of the present invention, the print processor is a SDPP which checks the status 84 of printing devices that are in communication with the SDPP. These may be local, network or remote printing devices. Among these printing devices is the default printing device previously selected 80. The SDPP of these embodiments checks the status of the default printing device 84 and determines its availability. When the default printer is available 86, the print job is sent to the default printer 88 through typical printing channels. Once the print job has been sent, the SDPP or related code may notify 90 the user of the job destination. However, when the job is sent to the default printer 88, as expected by the user, notification 90 is optional.

When the default printer is not available 86, these embodiments check the status of other printing devices to determine if any of them are available 92. If another printing device is available, the print task is "rolled over" 94 or directed to that available printing device instead of the default device. When this occurs, the user may be notified 96 of the new destination of the print task. If no printing devices are available 92, other options may be executed. In some embodiments, the print task may be cancelled 98 and the user may be notified 100 of the unsuccessful attempt. In other embodiments, the print processor may wait 102 for a period of time, suspend until re-initiated by the user or wait for some other event to occur after which it may again check the status of printing devices 84. If the default device or another device becomes available during the wait period, the print task may be directed to that device as if it were available before the wait period.

Figure 7:
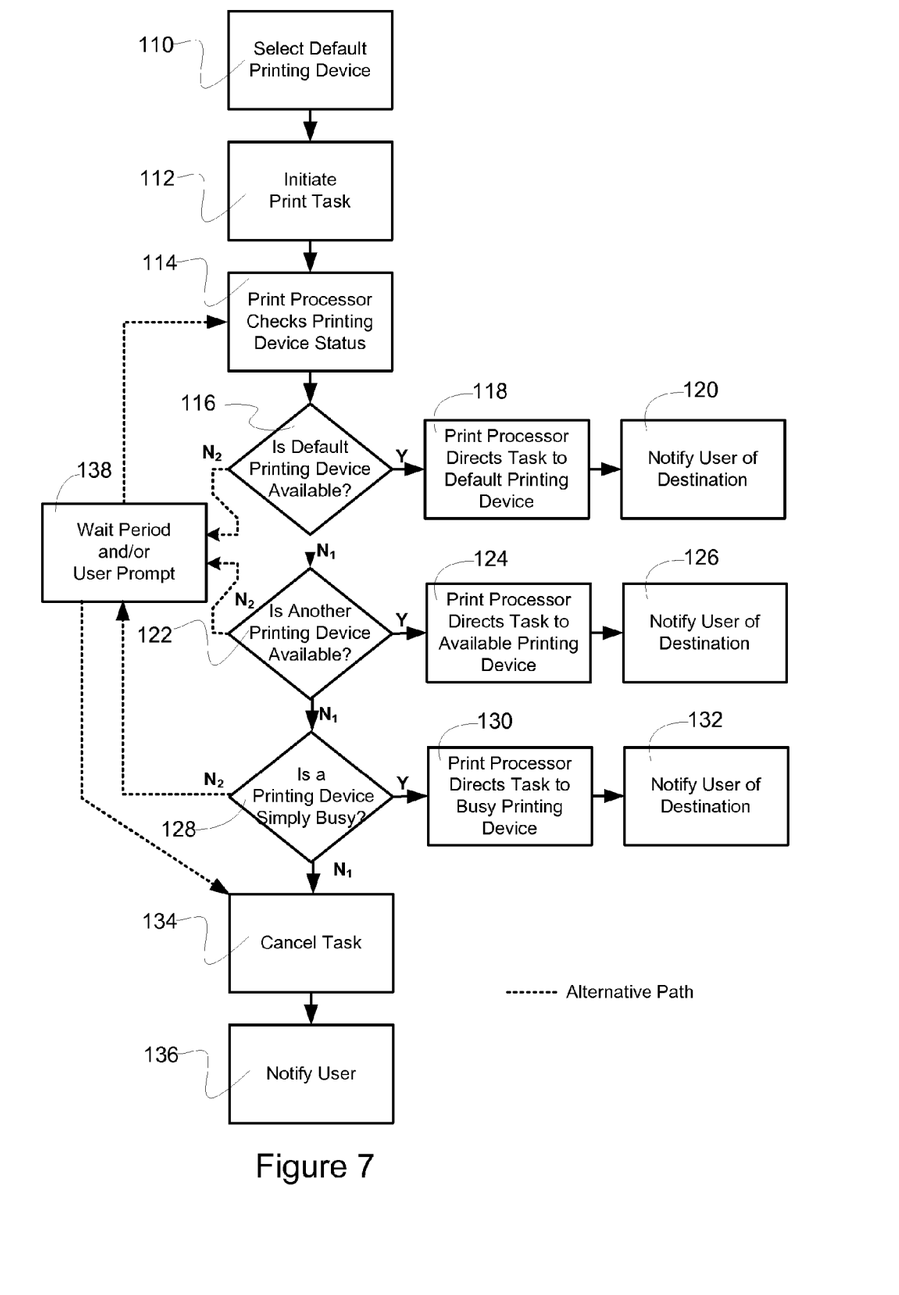
FIG. 7 is a diagram showing an embodiment of the present invention comprising printing device detection and rollover to available or busy devices.

Other embodiments of the present invention, illustrated diagrammatically in FIG. 7, may consider printing devices in a busy state. In these embodiments, a default device is generally selected 110 at some time prior to initiating a print task 112. After print task initiation 112, a print task follows typical print processes until it is routed to a print processor. When the task arrives at the print processor, the print processor checks the status 114 of printing devices and determines whether the devices are available or busy. A status of available or busy may depend on several parameters, but typically, an available printing device will be idle with no print tasks in its queue or memory and a busy printing device will be printing with or without print task in its queue. The actual conditions defining a busy or available status may vary according to a user's needs. Variables such as the number of tasks in a print queue, task size, estimated time to completion and other factors may be used to determine a device status as available, busy or other states.

Once the status of devices has been determined, the print processor determines whether the default printing device is available 114. If the default device is available, the print processor will direct the print task to the default device 118. Optional notification to the user of the destination of the print task 120 may be performed. If the default device is not available, the print processor may determine if other printing devices are available 122. If another printing device is available, the print processor may direct the task 124 to the available device and notify the user of the task destination 126.

When no printing devices are available 122, these embodiments may determine if the unavailable printing devices are simply in a busy state 128. If a printing device is simply busy, the print job is rolled over 130 to the busy printing device and the user is notified 132 of the final destination of the print job. When no printing devices are available and none are busy, the print job may be cancelled 134 and the user notified 136 that no printing devices are currently responding. Alternatively to task cancellation 134, some embodiments may wait for a period of time 138 and re-check the status of the printing devices. After a wait period these embodiments may re-evaluate device status and direct the print task to any available or busy devices which have changed status during the wait period as displayed in FIG. 7. Other embodiments may prompt for user input 138 to determine whether a wait period is desired, to determine the duration of a wait period, to offer task cancellation options or some other user choice. A wait period of user prompt 138 may be activated from any step in the device status detection and task direction processes. For example, and not by way of limitation, a wait period or user prompt 138 may be activated when default device is not available 116, when another device is not available 122, when a busy device cannot be found 128 or at some other point in these processes.

Figure 8:
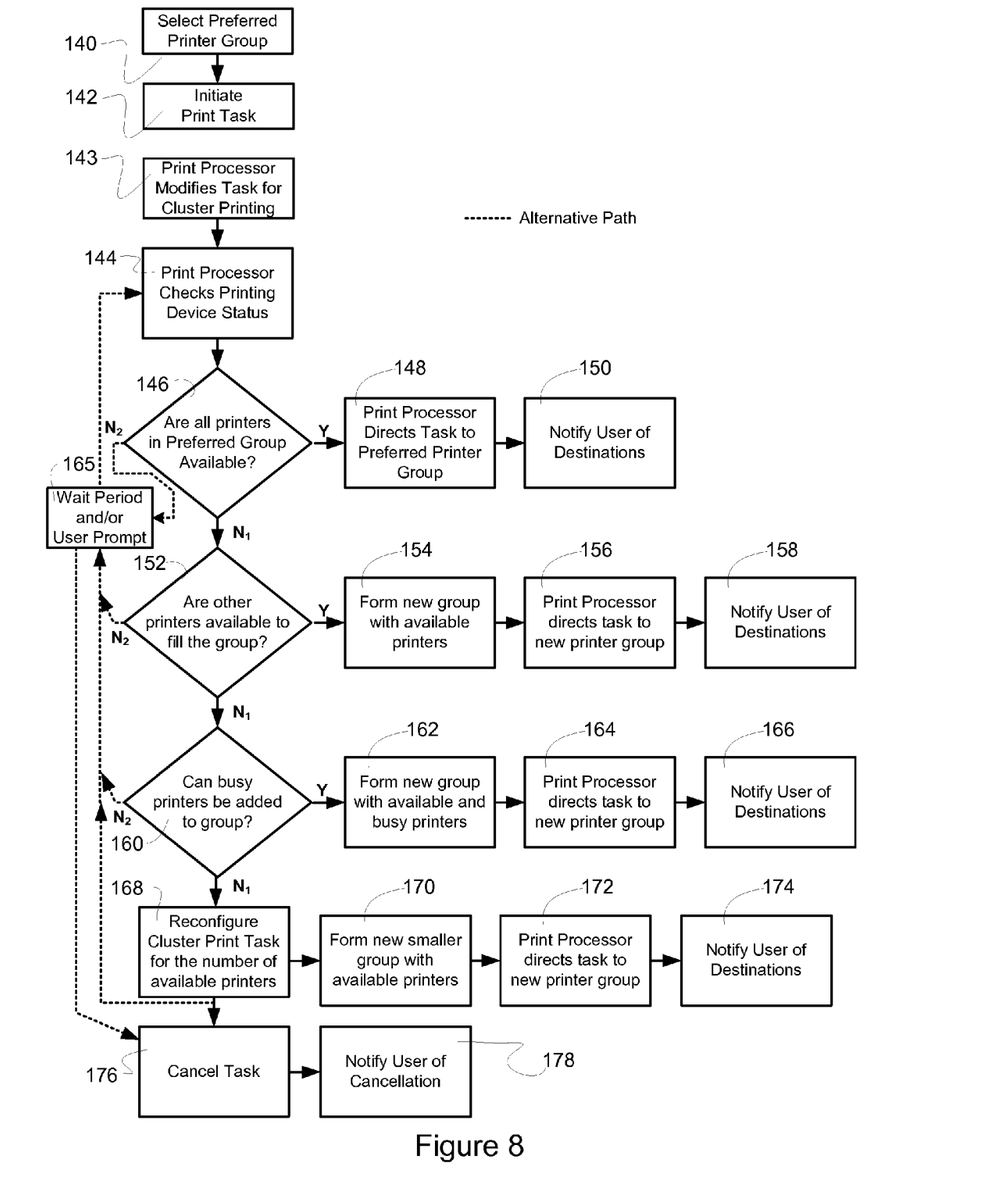
FIG. 8 is a diagram showing an embodiment of the present invention comprising printing device detection and device group management.

Some embodiments of the present invention are adapted for use in cluster printing environments as shown in FIG. 8. In these embodiments, a user may select one or more preferred printing devices 140 from a pool of printing devices in communication with the user's computing device. Preferred printing devices may be ranked in an order of preference, have no preference or a combination of ranked and non-ranked devices. These devices may also be ranked in multiple ways according to criteria such as speed, availability, location or other criteria. In some embodiments, a group of printers may be selected for cluster printing tasks as a preferred set of printers while one of these printers or another printer may be designated as a preferred printer for a single-printer task.

Once printers have been selected 140, a print task is initiated 142 in a typical manner as described above. When cluster printing options are desired, a cluster-enabled print processor (CPP) 143 of some embodiments of the present invention may modify a print task for cluster printing. Alternatively, a multiple-printer task configured without a CPP may be directed to a status-detecting print processor (SDPP) print processor.

When a SDPP of embodiments of the present invention receives a print task or set of print tasks, the SDPP may check the status 144 of printing devices in communication with it. When, in this example, a multiple-printer task or cluster print task is sent to the SDPP, the SDPP will check whether all printers in the preferred group are available 146. If all the preferred printers are available 146, the SDPP will direct the print tasks or modified print tasks to the preferred printers 148 and notify the user of the task destinations 150.

If all the preferred printers are not available 146, the SDPP may check to see if other printers are available 152. If a sufficient number of other printers are available to make up for the lack of preferred printers, a new group 154 may be formed to which the print tasks may be directed 156 by the SDPP. When print tasks are redirected in this manner, a user may be notified of the final destination of each print task or modified print task.

When a sufficient number of printers are not available to match the number in the preferred group 152, a SDPP may check for busy printers 160. These may be printers which are printing at the time of the status check, printers which will be available within a given time period, printers which have only a given number of jobs in their queue or printers in some other situation that would indicate they will soon be available. Many algorithms may be used to determine a busy status. As a non-limiting example, the maximum time to complete the current load or queue combined with a printer's estimated time to start or load a task. If enough busy printers are found such that when combined with all available printers they are as numerous as the preferred printer group, a new group will be formed 162 with the busy and available printers and the SDPP will direct the print tasks to this group 164. A user may again be notified 166 of the final destination of the print tasks.

If a sufficient number of available and busy printers cannot be found to make up a group equal in size to the initial preferred printer group 160, the initial print task may be reconfigured as a cluster print task that requires fewer printers, such as the number of available printers 168 or the number of available and busy printers combined. When this reconfiguration can be performed, a new smaller group of printers is formed 170 and the SDPP directs the new modified print tasks to printers in this new printer group 172. Again, users may be notified of the destination and configuration of the final modified print tasks 174.

When a sufficient number of printers is simply not available or otherwise unusable, a print task may be cancelled 176 and the user notified 178 of the cancellation and printers' status. Alternatively or additionally, a wait period or user prompt 165 may be added to these processes. A wait period or user prompt may be activated from any point in these processes in order to allow user input to decision-making processes and to allow devices to become available or otherwise change status when a current situation is unacceptable. After a wait period, the initial task or tasks may be re-initialized and printer status checking may begin anew as in some above-described embodiments.

When the number of printers in a network is large and the printers are geographically diverse, a user may want to limit the printers accessed by the SDPP to one or more select groups. Other reasons may also motivate a user to limit accessible printers. Some embodiments of the present invention may accommodate these needs. In some embodiments, illustrated in FIG. 9, a user may select a preferred group of printers 180 to which print tasks will be sent when they are available. Further, a user may select a group of backup printers 182 which may be substituted into the preferred group when printers in that group are not available, busy or otherwise unusable. Preferred and backup printing devices may be ranked in order of preference in some embodiments. Optionally, a user may designate printing devices which should not be used as preferred 180 or backup 182 printing devices thereby eliminating them from consideration by the SDPP. These selection processes allow a user to eliminate printing devices from consideration which are not acceptable to a user by virtue of their location, capability or some other reason.

Figure 9:
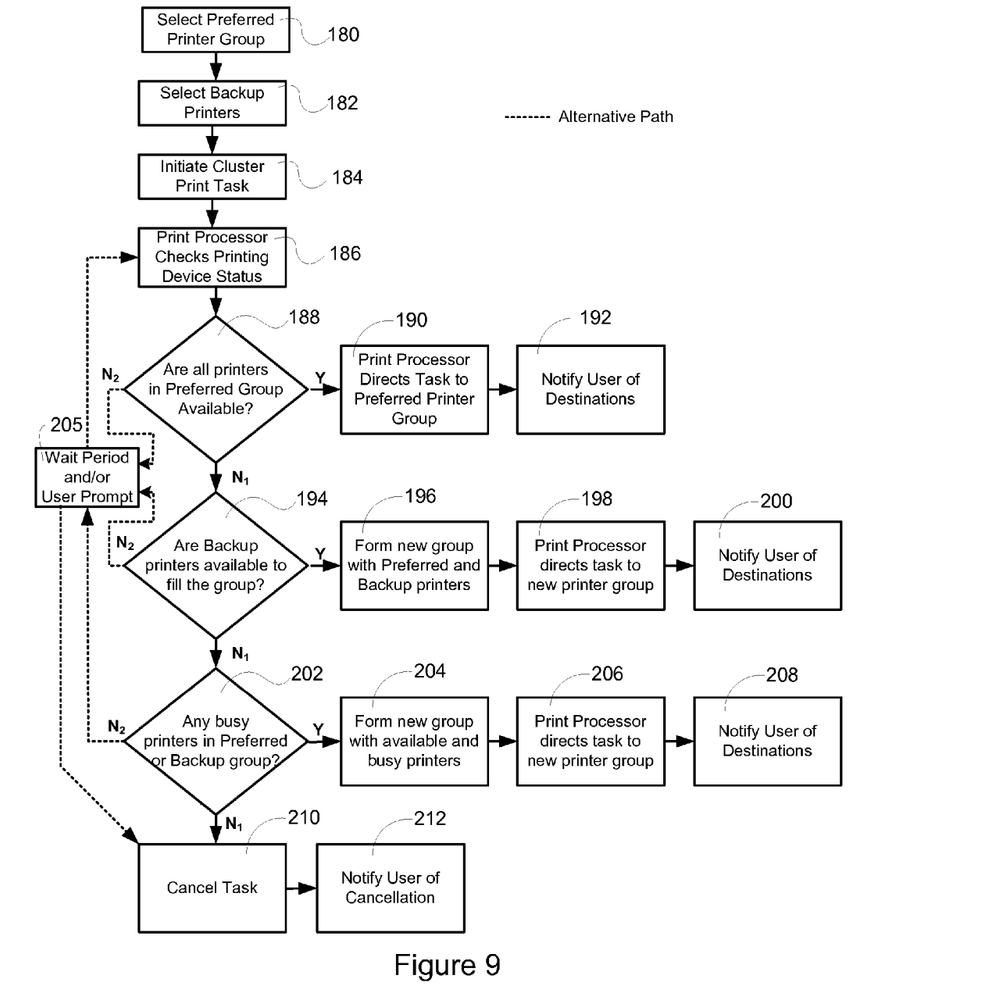
FIG. 9 is a diagram showing an embodiment of the present invention comprising printing device detection and preferred and backup group management.

Once preferred and backup printers have been selected, a user may initiate a cluster printing task or multiple-printer task 184 which is sent to a SDPP of embodiments of the present invention. This may be done through a CPP or my other means. In some embodiments, a CPP may be integrated with a SDPP to perform both cluster-enabling functions and status detection functions. The SDPP, upon receiving task or group of tasks, checks the status of printers in the preferred and backup printer groups 186. If all printers in the preferred group are available 188, the SDPP will direct the print tasks to the preferred group 190 and notify the user of the tasks' destinations.

When some of the preferred printers are not available 188, the SDPP may determine whether backup printers are available 194. If backup printers are available 194, they may be added to the preferred printers which are available to form a new group of available printers 196. The SDPP will then direct the print tasks to this new printer group 198 and notify the user of the destination of the print tasks 200.

When enough backup printers are not available to fill out the preferred group 194, the SDPP may add any busy printers in the preferred group 202 until the number of printers equals the number of preferred printers or the number of printers required for the particular task or tasks. If the addition of busy printers to a group creates a group of sufficient size, a new group is formed 204 and the SDPP may direct the print task or tasks to this new group 206. As in other embodiments, a user may be notified of task destinations and modifications.

If a sufficient number of available or busy printers cannot be found 202, a task may be cancelled 210, and the user notified of the cancellation 212. Alternatively, a SDPP may enter a wait period and restart the status checking process after a period of time. As an additional alternative to cancellation 210, the SDPP may reconfigure a task or tasks for output on a smaller number of printers as described in relation to FIG. 8.

As in some above-described embodiments, a wait period or user prompt 205 may be utilized in these embodiments to allow devices to become available or otherwise change status or to solicit user input at different points in these processes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of printing using a status-detecting print processor, said method comprising:
   a) generating a print task on a computing device;
   b) sending said print task to a print driver wherein said print driver resides on said computing device;
   c) sending said print task from said print driver to a status-detecting print processor wherein said status-detecting print processor resides on said computing device;
   d) receiving a print task at said status-detecting print processor;
   e) detecting, in response to said receiving, the availability of at least one printing device wherein said detecting comprises a direct communication between said status-detecting print processor and said at least one printing device, wherein said detecting further comprises communication using a protocol selected from the group consisting of Simple Network Management Protocol (SNMP), Remote Management (RMON) and Internet Printing Protocol (IPP) and
   f) directing said print task to an available printing device among said at least one printing device.

2. The method of claim 1 wherein said status-detecting print processor is an integral part of an operating system.

3. The method of claim 1 wherein said detecting further comprises accessing data from a Management Information Base (MIB).

4. The method of claim 1 wherein said detecting further comprises the use of an Application Program Interface (API) call.

5. A method for detecting the status of a printing device on a network, said method comprising:
   a) receiving a print task at a print processor wherein said receiving is from a print driver and wherein said print processor and said print driver reside on a computing device on which said print task was generated; and
   b) detecting, in response to said receiving, the status of a printing device on a network wherein said detecting comprises a direct communication between said print processor and said printing device, wherein said detecting further comprises communication using a protocol selected from the group consisting of Simple Network Management Protocol (SNMP), Remote Management (RMON) and Internet Printing Protocol (IPP) and wherein said detecting further comprises the use of an Application Program Interface (API) call; and wherein said communication does not access a remote computing device.

6. The method of claim 5 wherein said print processor is an integral part of an operating system.

7. The method of claim 5 wherein said detecting further comprises accessing data from a Management Information Base (MIB).

8. A method of improving the probability of successful print task completion using a status-detecting print processor, said method comprising:
   a) receiving a print task at a status-detecting print processor wherein said receiving is from a print driver and wherein said status-detecting print processor and said print driver reside on a computing device on which said print task was generated;
   b) detecting, in response to said receiving, through a direct communication between said status-detecting print processor and at least one printing device, the availability of said at least one printing device; wherein said detecting further comprises communication using a protocol selected from the group consisting of Simple Network Management Protocol (SNMP), Remote Management (RMON) and Internet Printing Protocol (IPP) and wherein said status of said at least one printing device is presented to a user for selection of one or more available devices and said directing directs said print task to a device selected by said user;
   c) directing said print task to an available printing device among said at least one printing device.

* * * * *